United States Patent [19]

Higami

[11] 4,186,910
[45] Feb. 5, 1980

[54] HOSE CONNECTING MOUTHPIECE

[76] Inventor: Masanobu Higami, 14-10, 2-chome, Asahi-machi, Takarazuka-shi, Hyogo-ken, Japan

[21] Appl. No.: 913,556

[22] Filed: Jun. 8, 1978

[51] Int. Cl.$^2$ .............................................. F16L 37/28
[52] U.S. Cl. .................................................. 251/149.6
[58] Field of Search ............... 251/149.1, 149.4, 149.5, 251/149.6, 149.7, 149.8; 137/614.04

[56] References Cited

U.S. PATENT DOCUMENTS

| | | | |
|---|---|---|---|
| 2,299,193 | 10/1942 | Trautman | 137/614.04 |
| 2,896,971 | 7/1959 | Kolar | 251/149.7 |
| 2,931,668 | 4/1960 | Baley | 137/614.04 |
| 3,592,439 | 7/1971 | Ritchie, Jr. | 251/149.4 X |
| 3,777,771 | 12/1973 | DeVisschel | 251/149.6 X |

*Primary Examiner*—William R. Cline
*Attorney, Agent, or Firm*—George B. Oujevolk

[57] ABSTRACT

A hose connecting mouthpiece comprising an insert having a rear end to be connected to the hose of a gas filling device, a union nut loosely fitting around the insert and having an internally threaded portion engageable with the externally threaded portion of a known nipple, a packing attached to the front end inner periphery of the insert and adapted for contact with a sealing face at the forward end of the nipple, and a valve core pushing member provided inside the insert and retractable into the insert by being pushed by the forward end of the valve core of the nipple. The mouthpiece is fittable to any one of three types of known nipples different in construction.

1 Claim, 4 Drawing Figures

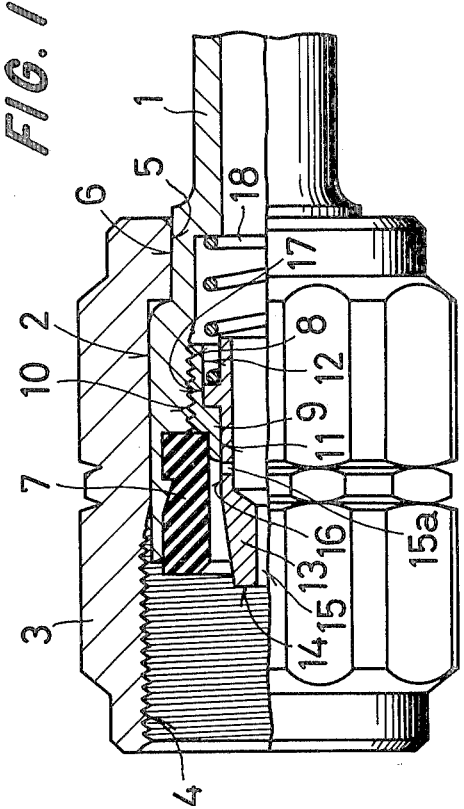
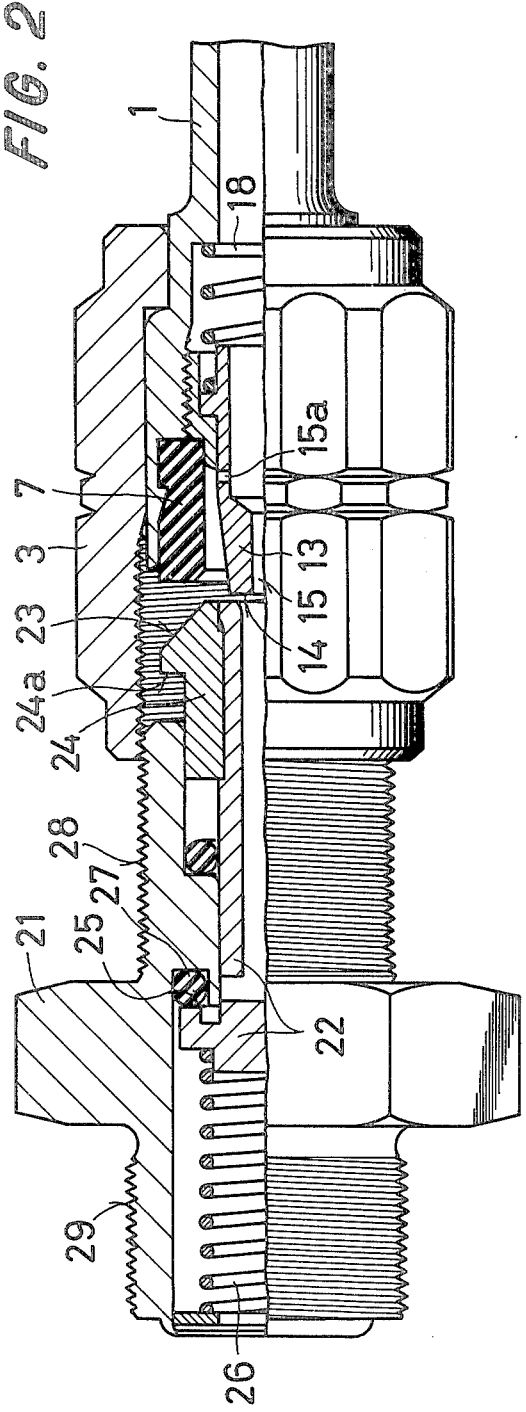

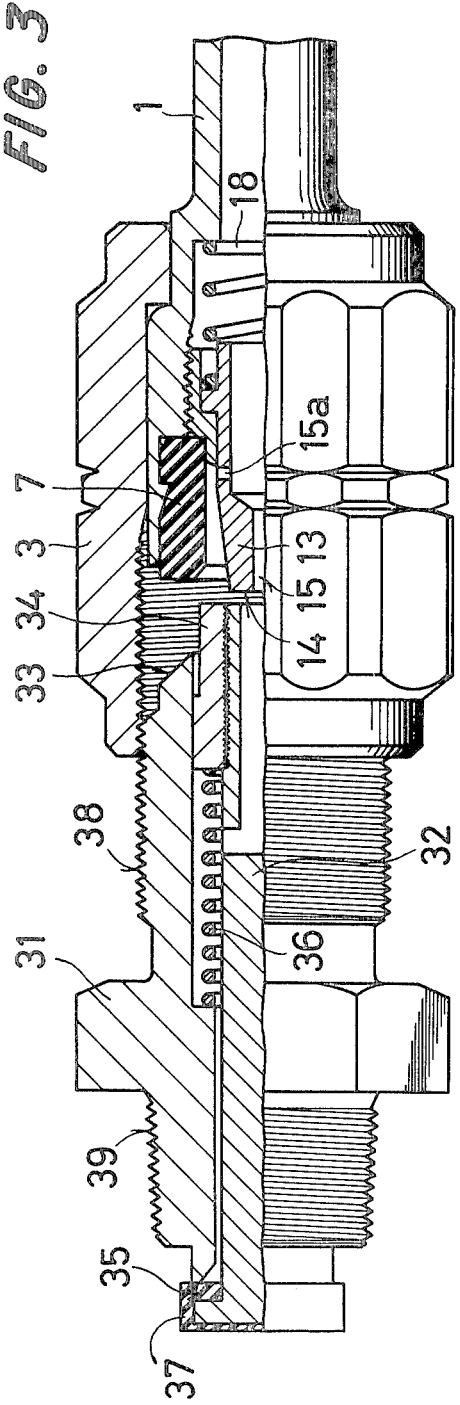
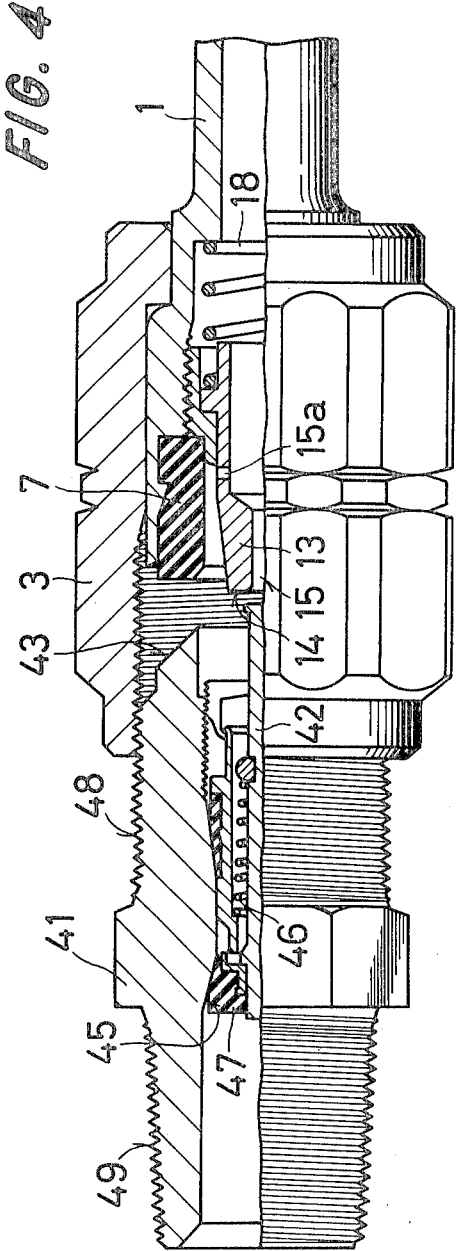

HOSE CONNECTING MOUTHPIECE

BACKGROUND OF THE INVENTION

The present invention relates to a hose connecting mouthpiece, and more particularly to such a mouthpiece which is fittable to any one of the three types of known nipples having different constructions for injecting gas into air conditioners for usual uses and for use in motor vehicles.

When filling automobile air conditioners with gas, the hose of a gas filling device must be connected to a nipple attached to the compressor of the conditioner for coupling the hose to the compressor for the injection of gas.

Presently three types of automobile air conditioners are in use. The compressors of these conditioners are each provided with a nipple of different construction. Accordingly three types of mouthpieces, conforming to the shapes of the different nipples respectively, need to be prepared for use as a connector fitted to the forward end of the hose of the gas filling device.

Thus the filling worker as in automobile maintenance service must follow a very troublesome procedure, while the possible use of a wrong mouthpiece could lead to an accident.

SUMMARY OF THE INVVENTION

The main object of this invention is to overcome the drawbacks heretofore involved in filling automobile air conditioners with gas.

Stated more specifically, the present invention contemplates provision of a hose connecting mouthpiece which is fittable to any one of the three types of nipples presently used and each having a different structure.

To fulfil the foregoing object, this invention provides a hose connecting mouthpiece comprising as insert having a rear end to be connected to the hose of a gas filling device, a union nut loosely fitting around the insert and having an internally threaded portion enageable with the externally threaded portion of a known nipple, a packing attached to the front end inner periphery of the insert and adapted for contact with a sealing face at the forward end of the nipple, and a valve core pushing member provided inside the insert and retractable into the insert by being pushed by the forward end of the valve core of the nipple.

According to a preferred feature of this invention, the valve core pushing member is slidably fitted in a core stopper screwed into the insert and is biased outward by a spring having a greater spring force than the spring incorporated in the known nipple and pressing the valve core thereof.

The object and features of this invention will become more apparent from the following detailed description and accompanying drawings.

BRIEF DESCRIPTION OF THE DRAWINGS

FIG. 1 is a view of a hose connecting mouthpiece embodying this invention with its upper half portion shown in vertical section;

FIG. 2 is a view showing the mouthpiece as connected to a known nipple of the A type, the upper half of the mouthpiece being in vertical section;

FIG. 3 is a view showing the mouthpiece as connected to a known nipple of the B type, the upper half of the mouthpiece being in vertical section; and FIG. 4 is a view showing the mouthpiece as connected to a known nipple of the C type, the upper half of the mouthpiece being in vertical section.

DETAILED DESCRIPTION

With reference to FIG. 1, an insert 1 is provided with a union nut 3 loosely fitting around its open front end 2. The union nut 3 has at its front end an internally threaded portion 4 enagageable with the externally threaded portion of a known nipple. The union nut 3 has an internal flange 5 formed at its rear end and fitting around a small-diameter portion 6 of the insert 1. A packing 7 is attached to the front end inner periphery of the insert 1. To the rear of the packing 7, the insert 1 has an internally threaded portion 8, with an externally threaded portion 10 of a tubular core stopper 9 screwed therein. The core stopper 9 is internally formed with a small-diameter portion 11 and a large-diameter portion 12. The small-diameter portion 11 is positioned on the open front end side of the insert 1.

A valve core pushing member 13 is slidably fitted in the core stopper 9. The pushing member 13 has a front end 14 for pushing the valve core of each of known nipples and is internally formed with a gas flow passage 15 extending therethrough. The pushing member 13 has a gas flow hole 15a in its peripheral wall, a small-diameter portion 16 fitting to the small-diameter portion 11 of the core stopper 9 and a flange 17 similarly fitting to the large-diameter portion 12 of the stopper 9.

A spring 18 housed in the insert 1 extends into the valve core pushing member 13 slidably fitted in the core stopper 9. Thus the pushing member 13 is biased by the spring 18 toward the open end of the insert 1 but is retained in position by the abutting contact of the flange 17 on the pushing member 13 with the small-diameter portion 11 of the core stopper 9 without being allowed to slip off.

Although not shown, the hose of a gas filling device is connected to the exposed rear end of the insert 1.

The hose connecting mouthpiece described is fittable to each of the three types of known nipples in the following manner.

FIG. 2 shows a nipple of the A type comprising a nipple main body 21 and a valve core 22 provided with an umbrella-shaped portion 24 joined to the core 22. The umbrella-shaped portion 24 has a dealing face 23 adapted for contact with the packing 7 of the mouthpiece of this invention. The valve core 22 has a valve face 25 which is held pressed against a packing 27 by a spring 26, whereby the gas flow channel of the nipple is kept closed.

The nipple main body 21 has at its one end an externaly threaded portion 28 onto which the union nut 3 of the mouthpiece of this invention can be screwed. The other end of the nipple main body 21 similarly has an externally threaded portion 29 for mounting the nipple on a compressor. The spring 26 has a smaller force than the spring 18 of the mouthpiece of the invention.

When the union nut 3 of the present mouthpiece is screwed onto the externally threaded portion 28 of the A-type nipple, the front end 14 of the valve core pushing member 13 comes into contact with the valve core 22 first.

When the union nut 3 is further driven, the pushing member 13 and the valve core 22 will act against each other under the action of the springs 18 and 26. However, since the force of the spring 26 on the valve core 22 is smaller, the valve core 22 is retracted.

With a further advance of the union nut 3, the valve face 25 of the valve core 22 moves out of contact with the packing 27 on the nipple main body 21, permitting flow of the gas.

The union nut 3, when further driven, brings the flange 24a of the umbrella-shaped portion 24 into contact with the forward end of the nipple main body 21, subsequently causing the front end of the valve core 22 to retract the front end 14 of the pushing member 13 in pushing contact therewith. Immediately thereafter, the sealing face 23 of the umbrella-shaped portion 24 comes into intimate contact with the packing 7 to maintain gas-tight connection between the nipple and the mouthpiece.

FIG. 3 shows a nipple of the B type comprising a nipple main body 31 and a valve core 32 provided in the interior of the main body 31. The core 32 has a hollow cylindrical elastic member 34 screwed on its front end and a packing 37 attached to the other end thereof. A spring 36 biases the valve core 32 toward its forward end, pressing the packing 37 against the valve face 35 of the nipple main body 31, whereby the gas flow channel of the nipple is kept closed.

The nipple main body 31 has at its forward end an externally threaded portion 38 onto which the union nut 3 of the mouthpiece of this invention can be screwed. The rear end of the nipple main body 31 similarly has an externally threaded portion 39 for mounting the nipple on a compressor. The forward end extremity of the nipple main body has a sealing face 33 adapted for contact with the packing 7 on the mouthpiece of this invention. The spring 36 has a smaller force than the spring 18 of the mouthpiece of the invention.

When the union nut 3 of the present mouthpiece is screwed onto the externally threaded portion 38 of the B-type nipple, the front end of the valve core pushing member 13 comes into contact with the cylindrical elastic member 34 screwed on the forward end of the valve core 32 first.

When the union nut 3 is further driven, the pushing member 13 and the valve core 32 will act against each other under the action of the springs 18 and 36. However, since the force of the spring 18 on the valve core pushing member 13 is greater, the valve core 32 is retracted. At the same time, the packing 37 on the inner end of the valve core 32 moves out of contact with the valve face 35 of the nipple main body 32, permitting flow of the gas.

The union nut 3, when further driven, brings the packing 7 on the mouthpiece into pressing contact with the sealing face 33 at the forward end extremity of the nipple main body 31, ensuring perfect gas-tight connection between the nipple and the mouthpiece.

FIG. 4 shows a nipple of the C type comprising a nipple main body 41 and a valve core 42 provided in the interior of the nipple main body 41. The valve core 42 has one end projecting from the forward end of the nipple main body 41 and the other end having a packing 47 attached thereto.

A spring 46 biases the valve core 42 toward its forward end, pressing the packing 47 against the valve face 45 of the nipple main body 41, whereby the gas flow channel of the nipple is kept closed.

The nipple main body 41 has at its forward end an externally threaded portion 48 onto which the union nut 3 of the mouthpiece of this invention can be screwed. The rear end of the nipple main body 41 similarly has an extrnally threaded portion 49 for mounting the nipple on a compressor. The forward end extremity of the nipple main body has a sealing face 43 adapted for contact with the packing 7 on the mouthpiece of this invention. The spring 46 has a smaller force than the spring 18 of the mouthpiece of the invention.

When the union nut 3 of the present mouthpiece is screwed onto the externally threaded portion 48 of the C-type nipple, the front end 14 of the valve core pushing member 13 comes into contact with the valve core 42 first.

When the union nut 3 is further driven, the valve core 42 retracts, since the spring 18 acting on the valve core 22 is stronger than the spring 46. At the same time, the packing 47 on the inner end of the valve core 42 moves out of contact with the valve face 45 of the nipple main body 31, permitting flow of the gas.

The union nut 3, when further driven, brings the packing 7 on the mouthpiece into pressing contact with the sealing face 43 at the forward end extremity of the nipple main body 41 to maintain perfect gas-tight connection between the nipple and the mouthpiece. The gas flows from the interior of the insert 1 into the nipple main body 41 by way of the gas flow passage 15 extending through the valve core pushing member 13 and via the gas flow hole 15a.

Although this invention has been described above with reference to a specific embodiment, various changes and modifications can be made without departing from the scope of the invention as defined in the appended claims.

What is claimed is:
1. A hose connecting mouthpiece comprising:
(a) an insert (1) having a large diameter portion front end and a small diameter portion (6) rear end to be connected to the hose of a gas filling device;
(b) a union nut (3) loosely fitting around the insert (1) and having an internally threaded front portion engagable with the externally threaded portion of a known nipple, said union nut (3) also having an internal rear flange (5) formed at its rear end fitting around the small diameter of the insert (1);
(c) a packing (7) attached to the front end inner periphery of the insert and adapted for contact with a sealing face at the forward end of known nipple;
(d) a core stopper (9) thready fastened in the insert (1) with an internal small diameter part (11) positioned towards the front end of the insert (1) and a large diameter portion (12) towards the rear end of the insert (1);
(e) a valve core pushing member (13) with a peripheral wall slidably fitted in the core stopper (9) and retractable therein by being pushed by the forward end of the valve core of a nipple, said pushing member (13) including a front end (14) for pushing the valve core of a nipple, a gas flow passage (15) extending therethrough, a gas flow aperture (15a) in its peripheral wall, a small diameter section (16) fitting into the small diameter portion (11) of the core stopper (9) and a flange member (17) fitting into the large diameter portion (12) of the core stopper (9); and,
(f) spring means (18) housed in said insert (1) engaging the valve core pushing member (13) and biasing said valve core pushing member towards the open end of said insert (1) but retained in position by the abutting contact of said flange means (17).

* * * * *